Patented Oct. 11, 1932

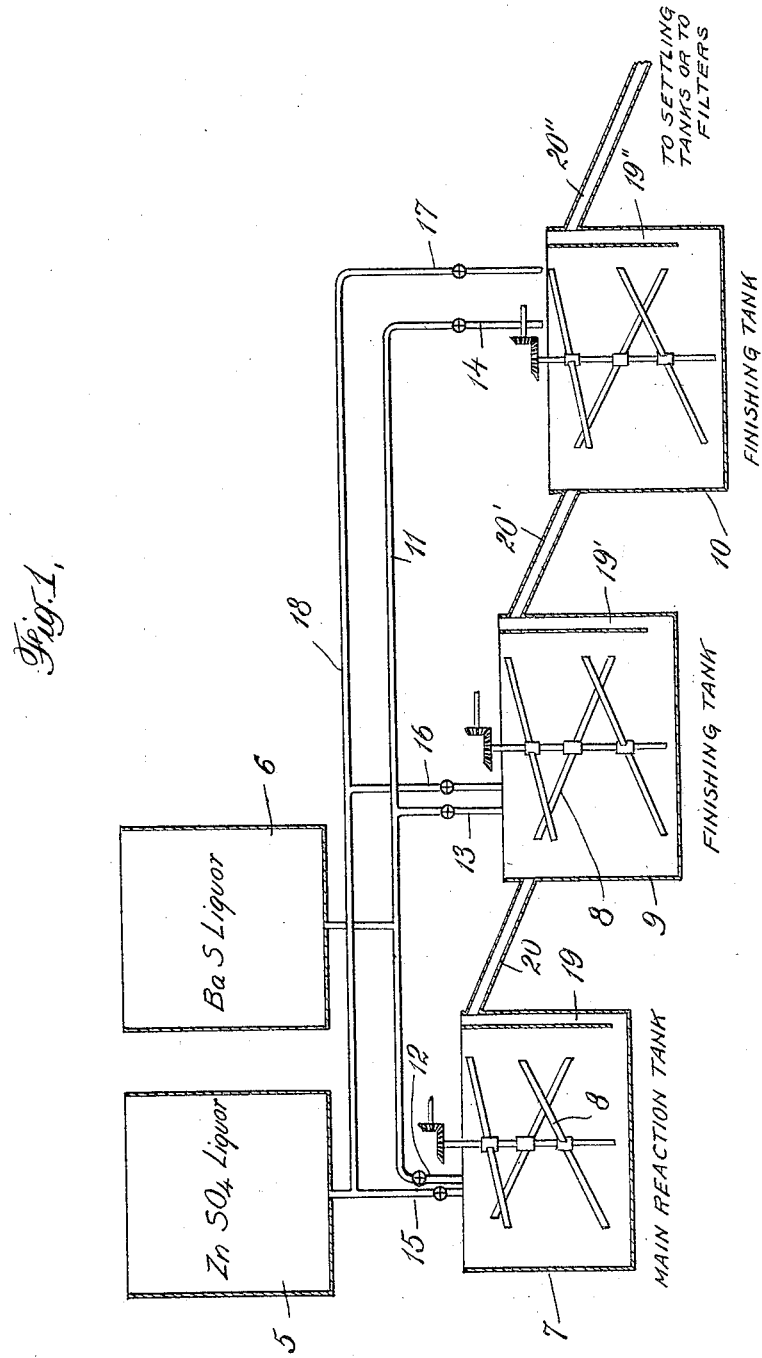

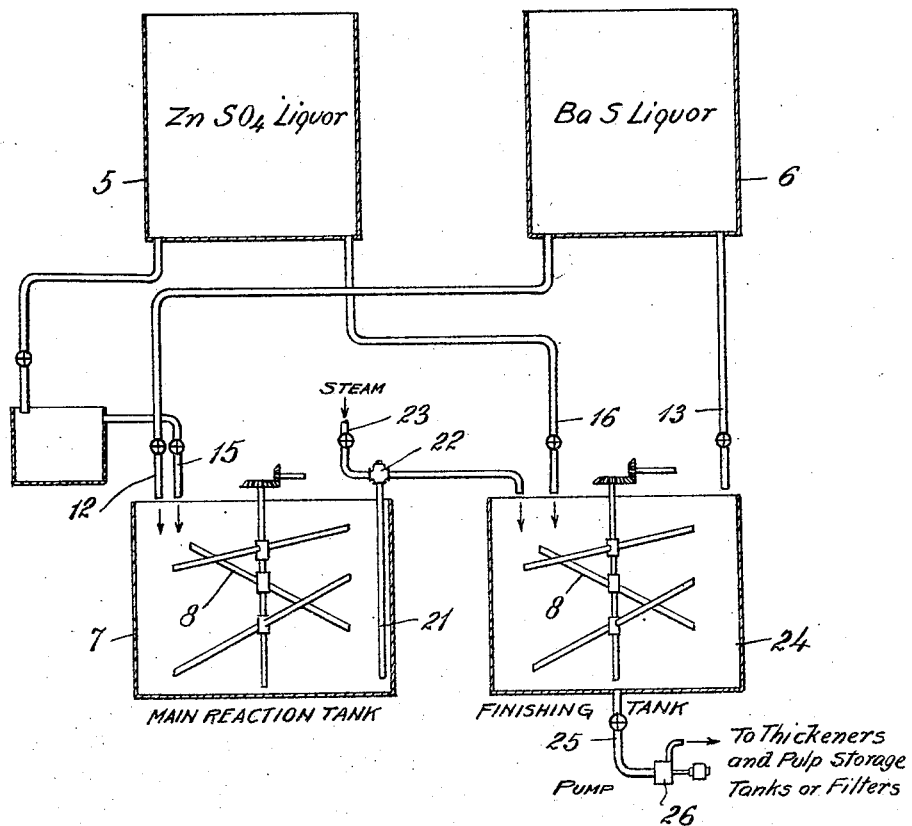
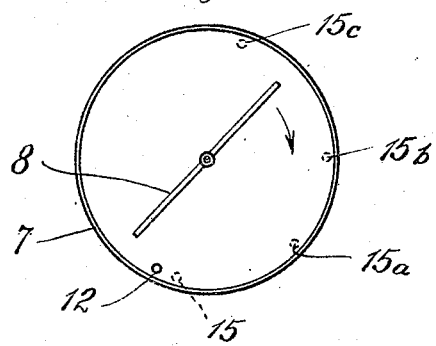

1,882,072

UNITED STATES PATENT OFFICE

EDMUND J. FLYNN, OF PALMERTON, PENNSYLVANIA, ASSIGNOR TO THE NEW JERSEY ZINC COMPANY, OF NEW YORK, N. Y., A CORPORATION OF NEW JERSEY

MANUFACTURE OF LITHOPONE

Application filed August 7, 1928. Serial No. 297,949.

This invention relates to the manufacture of lithopone and has for its object the provision of certain improvements in lithopone manufacture. More particularly, the invention aims to provide for the precipitation of crude lithopone under substantially uniform conditions.

Crude lithopone is manufactured or prepared by mixing solutions of zinc sulfate and barium sulfide. The resulting white precipitate constitutes what is known in the art as crude lithopone. It has heretofore been the customary practice to carry out this precipitation as a batch operation. Thus, it has been customary to first introduce a predetermined quantity of the purified zinc sulfate solution or liquor into the precipitating tank. A predetermined quantity of the purified barium sulfide solution or liquor is then gradually added to the precipitating tank, and the two solutions intimately mixed with a resultant precipitation of crude lithopone. The quantities of the zinc and barium solutions are so proportioned to each other that at the end of the operation only a slight excess of one or the other solution (usually the barium solution) is present.

As a result of this heretofore customary practice the conditions existing during the progress of the precipitation of a batch of lithopone undergo constant and important changes, especially with respect to liquor concentrations, hydrogen ion concentration, pulp density, temperature, agitation, etc. For example, if the precipitation is started with a solution containing 25% zinc sulfate and the balance water with the gradual addition thereto of a solution containing 12% barium sulfide and the balance water, it is clear that as the precipitation of crude lithopone proceeds and the barium and zinc salts are removed from solution, the water previously associated with these salts progressively dilutes the remaining zinc sulfate solution. In short, precipitation starts in a rather concentrated solution of zinc sulfate and ends in a very dilute solution of zinc sulfate.

Microscopic examination of the crude lithopone precipitated in this heretofore customary manner shows that the lithopone exists in various forms from single primary particles to various sizes of aggregates, that is, aggregates containing varying numbers of primary particles. I have discovered that important advantages, both with respect to product and process, may be obtained by carrying out the precipitation of the crude lithopone under substantially constant or uniform conditions of liquor concentrations, hydrogen ion concentration, pulp density, temperature, agitation, etc. I have found that these uniform conditions can be established and maintained by appropriately controlled continuous precipitation of the crude lithopone, as distinguished from the heretofore customary batch operations.

The present invention thus consists in causing the barium sulfide and zinc sulfate liquors to flow concurrently and at substantially constant predetermined rates into a mixing or precipitation tank from which such an amount of the contents (crude lithopone pulp) is continuously withdrawn as to maintain a substantially constant volume of crude lithopone pulp in the tank. After having fixed the rate of withdrawal and the rate of agitation, the various aforementioned conditions within the precipitating tank remain substantially constant provided of course that a predetermined uniform supply of each of the precipitating liquors is maintained. Precipitation of the crude lithopone under uniform conditions is thus achieved.

If the barium and zinc solutions enter the precipitation tank at substantially the same point, precipitation of the crude lithopone occurs in practically the original concentration of these solutions. If, however, the zinc sulfate solution enters the precipitation tank at some distance from the barium sulfide solution, the zinc solution is diluted by the mother liquor of the pulp as it is swept around by the agitator to meet the incoming barium solution. The precipitation therefore takes place with a zinc sulfate solution more dilute than the original. By thus varying the distance between the points at which the barium and zinc solutions are introduced into the precipitating tank, precipitation of the crude lithopone can be effected under varying conditions of concentration. Plant practice has shown that this method of controlling liquor concentrations gives very positive results and permits the production of any quality of crude lithopone possible by continuous precipitation.

In plant practice of the invention, the mixing of the barium and zinc solutions and the precipitation of the crude lithopone take place continuously in one tank. Crude lithopone pulp is continuously withdrawn from this mixing and precipitating tank at such a rate as to maintain a substantially constant liquid level in the tank. The pulp thus withdrawn from the mixing and precipitating tank is pumped or otherwise appropriately conveyed to one or more finishing tanks. The finishing tanks may be operated in a continuous manner, similar to the main reaction or precipitating tank, or the finishing may be carried out as a batch operation. In either case, the small additional quantity of barium sulfide liquor necessary to reach the desired predetermined endpoint of the precipitating reaction is added to the finishing tank. In the course of the finishing operation the crude lithopone pulp is agitated for about two to three hours, then thickened and filter-pressed in the customary manner. Practically all of the crude lithopone is precipitated in the first tank by the process of continuous precipitation. The remaining tanks are essentially for the purpose of balancing and adjusting the end-point of the precipitation.

Fig. 1 is of the accompanying drawings diagrammatically illustrates an arrangement of apparatus adapted for the practice of the invention, Fig. 2 is a diagrammatic illustration of a modified arrangement of the finishing tank, and Fig. 3 is a diagrammatic plan view of the main reaction or precipitating tank.

The apparatus illustrated in Fig. 1 of the drawings comprises a storage and supply tank 5 for the purified zinc sulfate liquor and a storage and supply tank 6 for the purified barium sulfide liquor. The main reaction or mixing tank 7 is positioned below the storage tanks 5 and 6 and is provided with a rotatable paddle agitator 8. The finishing tanks 9 and 10 are at respectively lower levels than the tank 7 and each is provided with a rotary agitator 8.

The barium sulfide liquor flows from the tank 6 to a pipe line 11 having valve-controlled branches 12, 13 and 14 for feeding barium sulfide liquor to the tanks 7, 9 and 10 respectively. Similarly, the tanks 7, 9 and 10 are adapted to receive zinc sulfate liquor through valve-controlled branches 15, 16 and 17, respectively, of a pipe line 18 leading from the tank 5.

As shown in Fig. 3, the branch pipe 12 is relatively stationary, whereas the branch pipe 15 is movable about the inner periphery of the tank 7, whereby the zinc sulfate liquor may be introduced into the tank 7 at any desired point around the inner periphery thereof. In Fig. 3 of the drawings four illustrative positions of the pipe 15 are indicated by reference numerals 15, 15a, 15b and 15c.

Zinc sulfate liquor flows continuously through the branch pipe 12 into the main reaction tank 7. Similarly, barium sulfide liquor flows continuously through the branch pipe 15 into the tank 7. The crude lithopone pulp in the tank 7 is agitated and mixed by the continuously rotating paddle stirrer 8. The liquor or pulp level in the tank 7 is always kept at a constant point, nearly tank-full.

Pulp is continuously withdrawn by gravity from the tank 7 through an up-take well 19 into an overflow launder 20 connecting with the first finishing tank 9. In the tank 9, the crude lithopone pulp is continuously agitated and mixed by the rotating paddle stirrer 8. Appropriate small amounts of barium sulfide liquor are introduced into the tank through the branch 13 until the desired endpoint is reached or closely approximated. Cude pulp is continuously withdrawn by gravity from the tank 9 through an uptake well 19' into an overflow launder 20' connecting with the second finishing tank 10. In the tank 10 the crude pulp is subjected to the same finishing treatment as in the tank 9, and the endpoint of the precipitating reaction is definitely and accurately controlled.

From the tank 10, the crude lithopone pulp is withdrawn by gravity through an uptake well 19" into an overflow launder 20" and conveyed to settling or thickening tanks. The thickened pulp is then filtered in accordance with the heretofore customary practice. The desired endpoint of the precipitating reaction will ordinarily be obtained in the finishing tanks 9 and 10 by the addition thereto of small amounts of barium sulfide liquor. Provision is made, however, for the introduction of zinc sulfate liquor to the tanks 9 and 10, in the event that this is desirable or necessary in the finishing operation.

A slightly modified arrangement of the finishing tanks is illustrated in Fig. 2 of the drawing. In the arrangement of Fig. 1, the various tanks are positioned at respectively different levels, and the flow of the pulp from the main reaction tank to and through the finishing tanks is effected by gravity. In the arrangement of Fig. 2, the main reaction tank and the finishing tanks are positioned at substantially the same level. It is therefore necessary to pump or otherwise mechanically withdraw the pulp from each tank. To this end, the main reaction tank 7 is provided with an outlet pipe 21 having its lower or inlet end near the bottom of the tank. The top of the pipe 21 connects with a steam ejector 22 having a valve-controlled steam supply pipe 23. Pulp is withdrawn from the main reaction tank by the ejector 22 and introduced into a finishing tank 24. In accordance with the principles of the present invention, the rates of introduction of barium sulfide solution and zinc sulfate solution into the tank 7 and the rate of withdrawal of pulp from this tank are so regulated as to maintain the liquor concentrations of the pulp in the tank substantially constant.

The finishing tank 24 has a valve controlled outlet 25 in the bottom thereof connected to a pump 26. When the tank 24 has been substantially filled with crude pulp withdrawn from the tank 7, it is finished off in substantially the manner heretofore customary in batch operations. In the meantime, the pulp withdrawn from the tank 7 is introduced into another finishing tank. From the finishing tanks 24 the crude lithopone pulp is conveyed to settlers, thickeners, storage tanks or the like, and subsequently to filters in the heretofore customary manner.

When the barium sulfide and zinc sulfate supply pipes occupy the positions represented by reference numerals 12 and 15 of Fig. 3, the zinc sulfate solution comes into contact with the barium sulfide solution almost immediately, without having had an opportunity of becoming appreciably diluted or dispersed by admixture with the precipitate slurry or crude lithopone pulp. Precipitation takes place in concentrations of solutions closely approaching those existing in the supply tanks 5 and 6. Under these conditions the crude lithopone settles more rapidly and has a higher hiding power than crude lithopone made by the heretofore customary batch operation. In the process of the invention, the ultimate particles of the crude lithopone are in uniformly sized aggregates, whereas in the batch operation the crude lithopone contains aggregates made up of widely varying numbers of particles. The calcined product, made in accordance with the invention, is soft and possesses unusually high hiding power, and when made into paint is exceptionally smooth and glossy.

When the zinc sulfate solution enters the tank 7 at the point indicated by reference numeral 15c of Fig. 3, there is considerable opportunity for it to be diluted and dispersed by admixture with the crude lithopone pulp before the agitator swirl carries it around to the point where it comes into contact with barium sulfide. In this case precipitation takes pace in very much more dilute solutions than when the zinc sulfate liquor enters at 15. When precipitated under these conditions, the crude lithopone settles even more rapidly and has even higher hiding power than when the zinc sulfate liquor enters at 15. The ultimate particles of the crude lithopone are uniformly aggregated as before, but the aggregates are larger. The calcined product is extremely soft, but has less hiding power and when made into paint is not so smooth and glossy as when the zinc sulfate solution is introduced at 15.

As the point of introduction of the zinc sulfate solution into the tank 7 is adjusted from 15 through 15a and 15b to 15c, the various qualities of the crude and finished lithopones show a progressive change from those of the two extreme cases just discussed.

Throughout this specification and the appended claims, I have used the expression "liquor concentrations" to designate the concentrations of barium sulfide, zinc sulfate and other water-soluble compounds in the liquor or medium in which the barium sulfide and zinc sulfate are brought into reactive relations with one another. While I prefer that this medium shall consist of a substantial body of crude lithopone pulp, wide variations in the volume of this body of pulp are permissible without departing from the principles of the invention.

The following advantageous results are obtained by the practice of the present invention:

1. A precipitate slurry or crude lithopone pulp in which the lithopone particles exist in a much more uniform state of aggregation than in the heretofore customary batch operation. Single particles and very large aggregates of particles are substantially absent. On the other hand, the relative size of the aggregates may be varied by varying the liquor concentrations in which precipitation occurs either by diluting the original reacting liquors or by varying the relative spacing of the streams of barium and zinc solutions entering the precipitation tank.

2. A precipitate slurry in which the lithopone settles more rapidly than in the heretofore customary batch practice, filters more readily, and results in a lithopone filter-cake of decidedly lower moisture content. This characteristic may be varied to some extent by varying the liquor concentrations in the precipitation stage.

3. A dried crude lithopone of a comparatively chalky, soft character, in contrast to the rather hard crude lithopone of the batch operation.

4. The hiding power of the crude lithopone is in general superior to that produced by the batch operation, and the hiding power may furthermore be varied over a considerable range by varying the liquor concentrations in which precipitation occurs.

5. A calcined or muffled lithopone which is decidedly softer and smoother than that produced in the batch operation. This permits the production with a decidedly lesser amount of grinding or wet milling of a lithopone equal to that of the batch operation, and with equal grinding a finished lithopone of decidedly softer and smoother texture.

6. An ultimate lithopone product equal and in general superior to that produced by the batch operation in hiding power, color, brightness and smoothness. Furthermore, an ultimate lithopone product with a superior uniformity of size of aggregates, which is probably responsible for the superiority of the product in the aforementioned characteristics, particularly smoothness.

I claim:—

1. In the manufacture of lithopone the method of producing crude lithopone of high quality which consists in continuously running aqueous solutions of zinc sulphate and of barium sulphide in reactive proportions into a precipitating and mixing tank, energetically stirring the contents of said tank, continuously drawing off the contents of said tank in such manner as to maintain an approximately constant level therein and approximately constant concentration of the liquid contents thereof and settling out a lithopone pulp from the mixture drawn from the tank.

2. In the method of claim 1 the further step of continuously passing the mixture from the precipitating and mixing tank through one or more similar precipitating and mixing tanks prior to settling out the pulp so as to insure a complete reaction.

3. The improvement in the manufacture of lithopone which comprises simultaneously and continuously flowing aqueous solutions of zinc sulfate and barium sulfide into a reaction chamber, providing a crude lithopone slurry in the reaction chamber having a liquor concentration adapted to promote the formation of substantially uniformly sized aggregates of the ultimate lithopone particles, then maintaining said slurry of crude lithopone at said predetermined liquor concentration in the chamber as further amounts of zinc sulfate and barium sulfide solution are brought into reactive relation, keeping the reaction mixture in the chamber in a state of continuous agitation adapted to provide a substantially complete reaction between the zinc sulfate and barium sulfide liquors, and continuously overflowing slurry from the reaction chamber, said slurry being withdrawn from the reaction chamber at or near the opposite end at which the reacting liquors are first introduced into the chamber.

4. The improvement in the manufacture of lithopone which comprises introducing simultaneously and continuously aqueous solutions of zinc sulfate and barium sulfide in a reaction chamber, providing a crude lithopone slurry in the reaction chamber having a liquor concentration adapted to promote the formation of substantially uniformly sized aggregates of the ultimate lithopone particles, then maintaining said slurry of crude lithopone at said predetermined liquor concentration in the chamber as further amounts of zinc sulfate and barium sulfide solution are brought into reactive relation, and continuously withdrawing regulated amounts of slurry from said reaction chamber.

5. The improvement in the manufacture of lithopone which comprises continuously introducing barium sulfide solution and zinc sulfate solution into a body of crude lithopone pulp, continuously withdrawing pulp from said body thereof, and regulating the rates of introduction of said solutions and the rate of withdrawal of said pulp so as to maintain the liquor concentrations of said body of pulp substantially constant, said liquor concentrations being adapted to promote the formation of substantially uniformly sized aggregates of the ultimate lithopone particles.

6. The improvement in the manufacture of lithopone which comprises continuously introducing barium sulfide solution and zinc sulfate solution into a body of crude lithopone pulp of substantially constant liquor concentrations, the point of introduction of said solutions into the pulp being so spaced as to bring the barium sulfide and zinc sulfate into reactive relation with one another at predetermined liquor concentrations adapted to promote the formation of substantially uniformly sized aggregates of the ultimate lithopone particles.

7. The improvement in the manufacture of lithopone which comprises continuously introducing barium sulfide solution and zinc sulfate solution concurrently into a body of crude lithopone pulp, and continuously maintaining the liquor concentrations of said body of pulp substantially constant, said liquor concentrations being adapted to promote the formation of substantially uniformly sized aggregates of the ultimate lithopone particles.

8. The improvement in the manufacture of lithopone which comprises concurrently introducing barium sulfide solution and zinc sulfate solution into a body of crude lithopone pulp of substantially constant liquor concentrations, said liquor concentrations being adapted to promote the formation of substantially uniformly sized aggregates of the ultimate lithopone particles.

9. The improvement in the manufacture of lithopone which comprises simultaneously and continuously introducing solutions of zinc sulfate and barium sulfide into a reaction chamber, regulating the flow of the solutions of zinc sulfate and barium sulfide into the reaction chamber, so as to provide and maintain a slurry of crude lithopone of substantially unchanging liquor concentrations, continuously withdrawing crude lithopone slurry from the reaction chamber and treating the crude lithopone slurry so withdrawn with the reacting solutions to obtain a predetermined end point of the precipitation reaction.

10. The improvement in the manufacture of lithopone which comprises simultaneously and continuously introducing solutions of zinc sulfate and barium sulfide into a reaction chamber, regulating the flow of the solutions of zinc sulfate and barium sulfide into the reaction chamber, so as to provide and maintain a slurry of crude lithopone of substantially unchanging liquor concentrations, continuously withdrawing crude lithopone slurry from the reaction chamber and treating the crude lithopone slurry so withdrawn to obtain a predetermined end point of the precipitation reaction.

11. The improvement in the manufacture of lithopone which comprises simultaneously and continuously introducing solutions of zinc sulfate and barium sulfide into a reaction chamber, regulating the flow of the solutions of zinc sulfate and barium sulfide into the reaction chamber, so as to provide and maintain a slurry of crude lithopone of substantially unchanging liquor concentrations, continuously withdrawing crude lithopone slurry from the reaction chamber to a finishing tank, treating the crude lithopone slurry in the finishing tank to obtain a predetermined end point of the precipitation reaction, and continuously withdrawing treated crude lithopone slurry from the finishing tank.

12. The improvement in the manufacture of lithopone which comprises simultaneously and continuously introducing solutions of zinc sulfate and barium sulfide into a mixing and precipitation tank, continuously withdrawing crude lithopone slurry from the mixing and precipitation tank, and treating the crude lithopone slurry so withdrawn to obtain a predetermined end point of the precipitation reaction.

13. The improvement in the manufacture of lithopone which comprises concurrently introducing solutions of barium sulfide and zinc sulfate into reactive relation with one another in a medium of substantially unchanging liquor concentrations, and then treating the resulting crude lithopone slurry to obtain a predetermined end point of the precipitation reaction.

14. The improvement in the manufacture of lithopone which comprises continuously introducing barium sulfide solution and zinc sulfate solution into a body of crude lithopone pulp of substantially constant liquor concentrations, the points of introduction of said solutions into the pulp being so spaced as to bring the barium sulfide and zinc sulfate into reactive relation with one another at predetermined liquor concentrations, and treating the resulting lithopone slurry to obtain a predetermined end point of the precipitation reaction.

15. The improvement in the manufacture of lithopone which comprises continuously introducing barium sulfide solution and zinc sulfate solution into a body of crude lithopone pulp, continuously withdrawing pulp from said body thereof, and regulating the rates of introduction of said solutions and the rate of withdrawal of said pulp so as to maintain the liquor concentrations of said body of pulp substantially constant, and treating the pulp so withdrawn to obtain a predetermined end point of the precipitation reaction.

In testimony whereof I affix my signature.

EDMUND J. FLYNN.